(12) United States Patent
Baik

(10) Patent No.: US 11,355,014 B1
(45) Date of Patent: Jun. 7, 2022

(54) SYSTEM FOR WARNING ABOUT INTERSECTION DANGER BASED ON SITUATION PREDICTION

(71) Applicant: BLUESIGNAL CORPORATION, Daejeon (KR)

(72) Inventor: Seng Tae Baik, Daejeon (KR)

(73) Assignee: BLUESIGNAL CORPORATION, Daejeon (KR)

(*) Notice: Subject to any disclaimer, the term of this patent is extended or adjusted under 35 U.S.C. 154(b) by 0 days.

(21) Appl. No.: 17/484,100

(22) Filed: Sep. 24, 2021

(30) Foreign Application Priority Data

Dec. 1, 2020 (KR) .................. 10-2020-0165864

(51) Int. Cl.
  *G08G 1/16* (2006.01)
  *G08G 1/01* (2006.01)
  *G06V 40/10* (2022.01)
  *G06V 40/20* (2022.01)

(52) U.S. Cl.
  CPC ............. *G08G 1/166* (2013.01); *G06V 40/10* (2022.01); *G06V 40/20* (2022.01); *G08G 1/0116* (2013.01); *G08G 1/0141* (2013.01); *G08G 1/0145* (2013.01); *G08G 1/167* (2013.01); *G06V 2201/08* (2022.01)

(58) Field of Classification Search
  CPC .... G08G 1/166; G08G 1/0116; G08G 1/0141; G08G 1/0145; G08G 1/167; G06K 9/00335; G06K 9/00362; G06K 2209/23; G06V 40/10; G06V 40/20; G06V 2201/08
  See application file for complete search history.

(56) References Cited

U.S. PATENT DOCUMENTS 9,870,703 B2 * 1/2018 MacNeille ............. B60Q 5/006
10,402,687 B2 * 9/2019 Anthony ............ G06K 9/00718

FOREIGN PATENT DOCUMENTS

| KR | 10-1339736 B1 | 12/2013 |
| KR | 10-1744282 B1 | 6/2017 |
| KR | 10-2018-0111375 A | 10/2018 |
| KR | 10-2021079 B1 | 11/2019 |
| KR | 10-2181222 B1 | 11/2020 |

* cited by examiner

*Primary Examiner* — Michael V Kerrigan
(74) *Attorney, Agent, or Firm* — Novick, Kim & Lee, PLLC; Jae Youn Kim

(57) ABSTRACT

Provided is a system for warning about intersection danger on the basis of behavior prediction. The system includes a sensor for detecting and predicting actions of surrounding objects, such as vehicles and pedestrians, and a function of providing an alarm feedback and can perform independent computation due to a separate processor installed therein for edge computing.

4 Claims, 5 Drawing Sheets

SYSTEM FOR WARNING ABOUT INTERSECTION DANGER BASED ON SITUATION PREDICTION

CROSS-REFERENCE TO RELATED APPLICATION

This application claims priority to and the benefit of Korean Patent Application No. 10-2020-0165864, filed on Dec. 1, 2020, the disclosure of which is incorporated herein by reference in its entirety.

BACKGROUND

1. Field of the Invention

The present invention relates to a system for warning about intersection danger on the basis of situation prediction.

2. Discussion of Related Art

Pedestrian accidents account for 30% or more of the total traffic accident fatalities with about 1,300 people per year, and thus measures are necessary to reduce accidents. Particularly, at intersections, accidents caused by blind spots when vehicles make a right turn, accidents in school zones, etc. occur frequently. However, there are few systems and services that can mitigate the accidents other than speeding crackdown and punishment.

Pedestrian safety systems currently in operation are manually managed through operation, such as 24-hour monitoring, of the city information center of each local government. However, according to the pedestrian safety systems, manpower is inefficiently managed, and there is no alarm function. Also, current traffic safety systems correspond to a "reactive" method of installing safety facilities, such as bumps, fences, or speed cameras, in areas prone to traffic accidents through statistical data analysis after traffic accents occur. Accordingly, "proactive" systems and services are necessary to prevent pedestrian accidents.

Meanwhile, a one-way warning service is known for sensing the location of a pedestrian through a camera and transmitting the corresponding information to a vehicle. This service is configured such that a control server determines a pedestrian in danger on the basis of image data received from road side units (RSUs) and transmits the corresponding information back to the RSUs. Accordingly, there is no function of notifying pedestrians of danger, and it is not possible to perform the service function when information transmission is delayed due to communication between a server and RSUs or there is a communication failure.

As a patent document, Korean Patent No. 10-2181222 discloses a safety management system including an image capturing part which images a pedestrian who is walking in a crosswalk area, an object analyzer which determines whether the pedestrian performs an abnormal action while walking, and a safety manager which outputs and transmits a first danger signal providing a notification that the pedestrian is in danger to a selected auxiliary facility at the crosswalk when it is determined that the pedestrian performs an abnormal action and commands the auxiliary facility to output the first danger signal such that pedestrians crossing roads are allowed to safely walk and drivers of vehicles entering crosswalk areas are aware that pedestrians are walking in the crosswalks before entering the crosswalk areas. Here, auxiliary facilities are a plurality of posts in front of the crosswalk and also serve as sensors. This technology is useful for a straight road but has a disadvantage in that it is necessary to install auxiliary facilities at a crosswalk entrance and exit which pedestrians frequently pass through.

As another patent document, Korean Patent No. 10-2021079 discloses a system for monitoring intersection driving and pedestrian safety using a light detection and ranging (LiDAR), the system including an information collector including a camera for collecting an image of a pedestrian who crosses along a crosswalk and a LiDAR for collecting traffic information of a vehicle traveling in an intersection area, a controller which controls output of a pedestrian safety warning for preventing a pedestrian accident on the basis of information collected through the camera and the LiDAR of the information collector, and a pedestrian safety output part which outputs a pedestrian warning including the pedestrian image so that a driver can be aware of the pedestrian who crosses along the crosswalk. However, the information collector uses the LiDAR for all traveling vehicles, and thus it is difficult to accurately detect a vehicle that is actually dangerous to pedestrians. Also, a driver is warned through a screen of a vehicle and thus prone to miss a dangerous situation.

A system is necessary to immediately determine a pedestrian in danger and a dangerous vehicle on the basis of image data and then output a warning and raise an alarm as a two-way collision warning service for sensing the location of the pedestrian and transmitting information on whether a pedestrian is in danger to a vehicle while transmitting the location of the vehicle and whether the vehicle is dangerous according to the speed to the pedestrian unlike the above related arts. To this end, the present invention has been devised.

SUMMARY OF THE INVENTION

The present invention is directed to providing a system for warning about intersection danger on the basis of behavior prediction which includes a sensor for detecting and predicting actions of surrounding objects, such as vehicles and pedestrians, and a function of providing an alarm feedback and may perform independent computation due to a separate processor installed therein for edge computing.

According to an aspect of the present invention, there is provided a system for warning about intersection danger on the basis of behavior prediction, the system including a first box configured to detect a vehicle and output a warning to a driver of the vehicle and a second box configured to detect a pedestrian and output a warning to the pedestrian. The system is disposed on a sidewalk to simultaneously acquire an image of the vehicle and an image of the pedestrian. The system include a pedestrian image receiver, a pedestrian action predictor configured to determine an action of the pedestrian after a certain time has elapsed on the basis of image data of the pedestrian image receiver, a vehicle image receiver, a vehicle movement predictor configured to determine movement of the vehicle after the certain time has elapsed on the basis of image data of the vehicle image receiver, a danger prediction determiner configured to determine whether a dangerous situation will occur on the basis of data of the pedestrian action predictor and data of the vehicle movement predictor, and a warning displayer.

The first box and the second box may have the same appearance and may be installed symmetrically with respect to a post. An image sensor configured to acquire the image of the vehicle is installed on an external surface of the first box, and an image sensor configured to acquire the image of the pedestrian is installed on an external surface of the second box. The pedestrian image sensor may image eyes in the pedestrian's face and the pedestrian's gaze and transmit an eye image and a gaze image to the pedestrian action predictor, and the pedestrian action predictor may calculate a posture after the certain time has elapsed on the basis of the pedestrian's gaze.

The danger prediction determiner may determine that the dangerous situation will occur on the basis of the data of the pedestrian action predictor and the data of the vehicle movement predictor when locations of the pedestrian and the vehicle overlap or are within a certain distance after the certain time has elapsed.

When there is a crosswalk immediately after where the vehicle makes a right turn and it is predicted that the pedestrian will be in the crosswalk or the vehicle will make a right turn, the danger prediction determiner may determine that the dangerous situation will occur.

A beam projector configured to notify vehicle drivers of a dangerous situation may be installed on the external surface of the first box and display text or an image providing a notification of the dangerous situation at a certain distance in front of a crosswalk, and a beam projector configured to notify pedestrians of the dangerous situation may be installed on the external surface of the second box and display text or an image providing a notification of the dangerous situation at a sidewalk at least in front of the crosswalk.

An electronic board configured to notify vehicle drivers of a dangerous situation may be installed on the external surface of the first box, and an electronic board configured to notify pedestrians of a dangerous situation may be installed on the external surface of the second box.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Each exemplary embodiment of the present invention is merely an example for aiding understanding of the present invention, and the present invention is not limited thereto. The present invention may be configured as a combination of at least one of individual configurations and individual functions included in each exemplary embodiment of the present invention.

Figure 1:
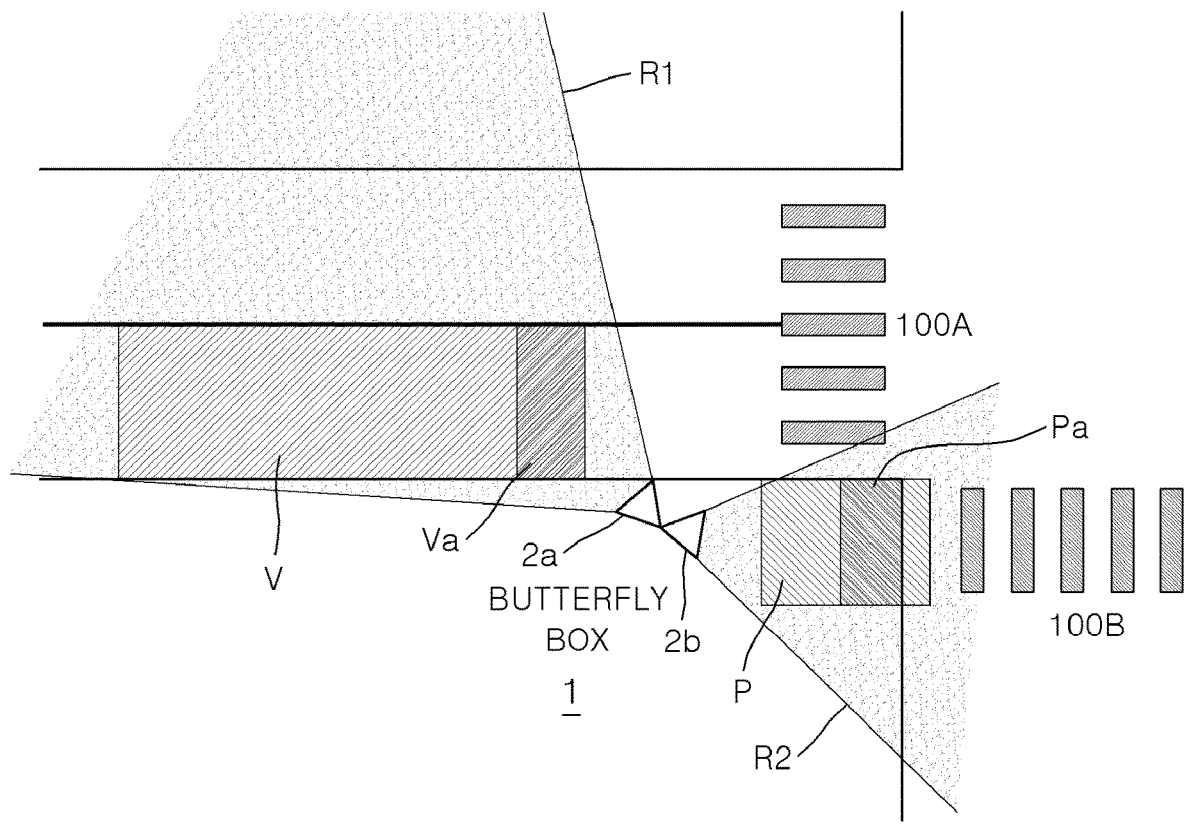
FIG. 1 is a diagram illustrating an operation of a system for warning about intersection danger on the basis of behavior prediction according to the present invention.

FIG. 1 is a diagram illustrating an operation of a system 1 for warning about intersection danger on the basis of behavior prediction according to the present invention. The system 1 for warning about intersection danger on the basis of behavior prediction is simply referred to as a "warning system" or referred to as a "butterfly box" because of its shape being similar to a butterfly.

There are two crosswalks 100A and 100B at an intersection of a crossroads. Pedestrians are mainly required to pay attention to vehicles going straight at the crosswalk 100A and vehicles turning right at the crosswalk 100B.

The butterfly box 1 according to the present invention has an appearance of a symmetric housing. A first box 2a detects a vehicle and outputs a warning to a driver of the vehicle, and a second box 2b detects a pedestrian and outputs a warning to the pedestrian. In FIG. 1, the butterfly box 1 is disposed at a corner of the intersection to simultaneously acquire images of a vehicle and a pedestrian.

An overall area which is detectable by the first box 2a is a trapezoidal area R1, but as a vehicle detection area V, a rectangular section within, for example, 20 m to 30 m left from the crosswalk 100A may be set so that vehicles which may go straight or make a right turn are detected. An overall area which is detectable by the second box 2b is a triangular area R2, but as a pedestrian detection area P, a quadrilateral section which is obtained by extending the crosswalks 100A and 100B and connected to entrances of the crosswalks 100A and 100B on the sidewalk may be set so that pedestrians who will cross along the crosswalks 100A and 100B are accurately identified. The area P includes parts of the crosswalks 100A and 100B and the sidewalk in front of the crosswalks 100A and 100B. This is an example, and the first box 2a and the second box 2b may be manufactured to be relatively rotatable such that imaging areas may be adjusted appropriately according to road traffic conditions and the number of lanes.

The butterfly box 1 outputs a warning about danger to pedestrians and vehicle drivers in various ways. As an example, in FIG. 1, a quadrilateral pedestrian warning projection area Va is set in a direction toward the crosswalk 100A at an end of the vehicle detection area V in succession. Also, a vehicle warning projection area Pa is set to overlap the pedestrian detection area P on the sidewalk meeting the entrance of the crosswalk 100B so that a warning is effectively given to pedestrians. This is an example. As will be described below, a warning projection area may be appropriately modified, and an output of a warning may include sound such as a voice.

Figure 2:
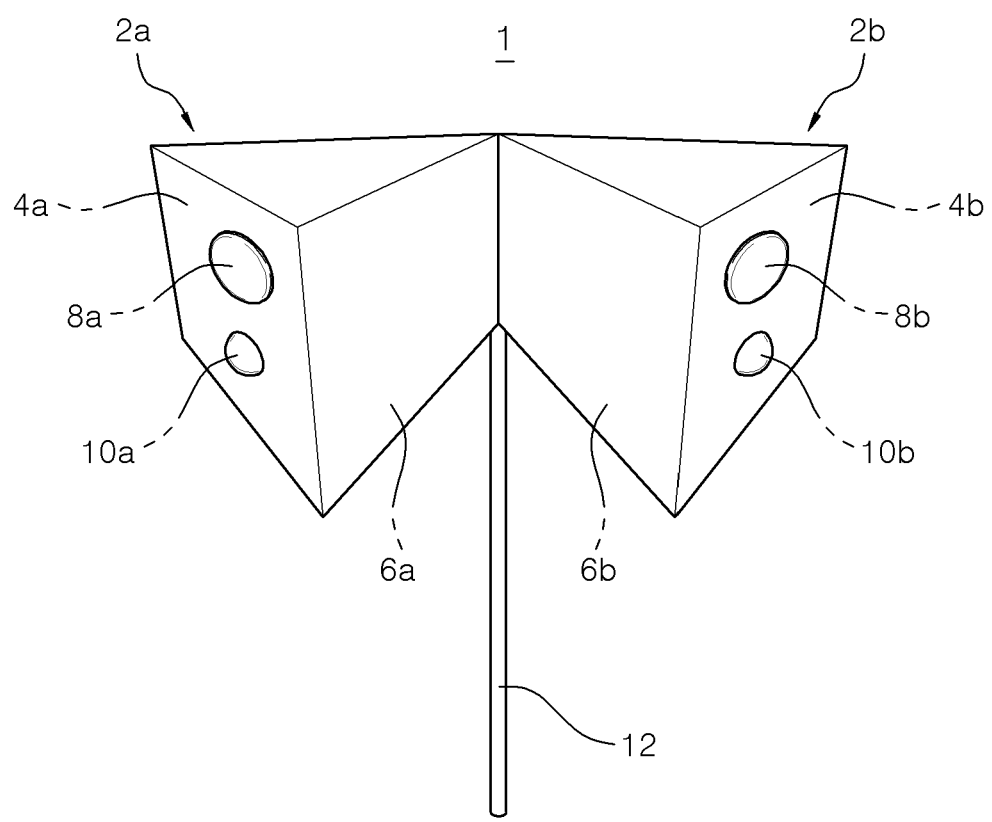
FIG. 2 is a perspective view of a butterfly box which is a warning system according to the present invention.

FIG. 2 is a perspective view of the butterfly box 1 which is a warning system according to the present invention. The first box 2a and the second box 2b have the same appearance. The first box 2a and the second box 2b are installed on a sidewalk with the boundary therebetween being supported by a post 12. The first box 2a and the second box 2b are rotatable about the post 12.

The first box 2a has a triangular prismatic shape overall. An image sensor 8a is installed in an upper portion of a first surface 4a having a quadrilateral shape on the left side, and a warning beam projector 10a is installed in a lower portion of the first surface 4a. Although not shown in the drawing, a speaker which outputs a warning by sound may be further installed.

The second box 2b has the same structure as the first box 2a, but a first surface 4b is formed at a position spaced apart from the first box 2a.

The first box 2a may detect vehicles, and the second box 2b may detect pedestrians, or vice versa. In the present invention, inner surfaces 6a and 6b are formed in the boxes 2a and 2b so that virtual center lines of the first surfaces 4a and 4b cross each other. Accordingly sufficient imaging spaces are ensured. In particular, when there is a crosswalk immediately after where a vehicle makes a right turn, the vehicle and a pedestrian that are present at right angles with respect to the butterfly box 1 may be simultaneously detected. For this reason, the warning system 1 according to the present invention has a shape like a butterfly with spread wings, that is, a pleasing appearance, and is very convenient to manufacture and install.

Figure 3:
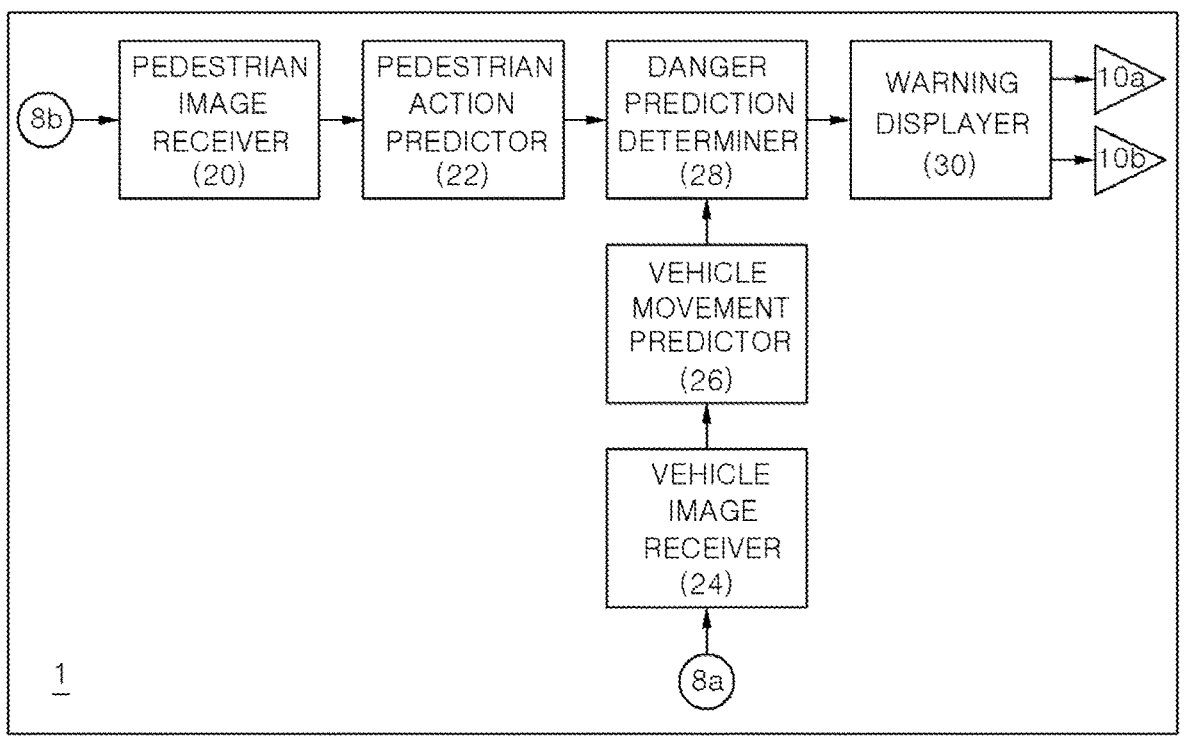
FIG. 3 is a block diagram showing an internal configuration of the butterfly box according to the present invention.

FIG. 3 is a block diagram showing an internal configuration of the butterfly box 1 according to the present invention. The butterfly box 1 includes a pedestrian image receiver 20, a pedestrian action predictor 22, a vehicle image receiver 24, a vehicle movement predictor 26, a danger prediction determiner 28, and a warning displayer 30. For convenience of description, it is assumed in FIG. 3 that the first box 2a detects a vehicle and the second box 2b detects a pedestrian.

The pedestrian image receiver 20 receives an image captured by an image sensor 8b. The image sensor 8b may be a camera or a video recorder which may capture a video but is not particularly limited. The image sensor 8b images not only whether there is a pedestrian but also eyes in the pedestrian's face and the pedestrian's gaze. In other words, the image sensor 8b acquires detailed action information of micro-scale such as the pedestrian's gaze. When a pose estimation technology is used, the pedestrian's gaze is identified, and a future location of the pedestrian is estimated such that a driver may be provided with warning feedback.

The pedestrian action predictor 22 determines an action of the pedestrian after a certain time has elapsed, for example, one second or two seconds, on the basis of image data of the pedestrian image receiver 20. Actions mainly denote future locations of pedestrians. Although the location of the pedestrian is determined mainly from an angle of the upper body, directions of the legs, whether the pedestrian stops in front of a crosswalk, a distance between an entrance of the crosswalk and the pedestrian, and a walking (or running) speed, the gaze is taken into consideration as a major factor as described above. When the gaze is directed to the front of the crosswalk, the crosswalk is determined as a crossing location regardless of the distance from the crosswalk. When the gaze is directed to another location, the location of the pedestrian is determined on the basis of the other factors.

The vehicle image receiver 24 receives an image captured by the image sensor 8a. The image sensor 8a images not only whether there is a vehicle but also a vehicle speed and whether, for example, a right turn indicator (a.k.a. "blinker") is blinking.

The vehicle movement predictor 26 determines movement of the vehicle after a certain time has elapsed, for example, one second or two seconds, on the basis of the image data of the vehicle image receiver 24. The movement mainly denotes a future location of the vehicle. The location of the vehicle is determined on the basis of a current lane, a vehicle speed, and whether a turn indicator is blinking, but determinants are not limited thereto.

The danger prediction determiner 28 determines whether the locations of the pedestrian and the vehicle overlap after a certain time has elapsed on the basis of data of the pedestrian action predictor 22 and the vehicle movement predictor 26. When it is determined that the two locations overlap, a situation of "collision" may occur. Although the two locations do not overlap, there is a probability of danger when the two locations are within a certain distance, and thus this is determined as a dangerous situation. When a prediction time (e.g., two seconds) of the pedestrian action predictor 22 and a prediction time (e.g., two seconds) of the vehicle movement predictor 26 are the same, accuracy in the prediction of danger may be increased. When a red light is turned on among crosswalk traffic lights which are not shown in the drawing, the danger prediction determiner 28 may determine that the dangerous situation will not occur regardless of the future location of the pedestrian. However, when the pedestrian ignores the traffic light, the pedestrian is not warned. Also, even when the crosswalk traffic light is green, vehicles still make a right turn. Therefore, connection with traffic lights is not essential to the present invention, unlike the related arts. Further, when the crosswalk is immediately after where the vehicle makes a right turn and it is predicted that the pedestrian will be in the crosswalk, a warning may be output to the vehicle driver regardless of the distance between the vehicle and the pedestrian, or when the vehicle is predicted to make a right turn, a warning may be output to the pedestrian such that safety may be increased.

When it is determined that the dangerous situation will occur, the danger prediction determiner 28 operates the warning displayer 30. The warning displayer 30 may give adequate warnings to the driver and the pedestrian through the beam projector or an alarm function.

The configuration of the present invention shown in FIG. 3 is implemented as chips or processors on a substrate in the butterfly box 1 (on-board processors), may perform independent computation, and does not transmit or receive data to or from an external server of a traffic control center or the like. Therefore, it is possible to build a two-way proactive system which outputs a warning by simultaneously analyzing and computing images of a vehicle and a pedestrian, is installed at a site to perform all functions, and may perform edge computing.

A warning of the present invention may be output in various ways, and the warning beam projectors 10a and 10b may be changed accordingly.

For example, electronic boards may be installed on the first surfaces 4a and 4b, and when a vehicle or a pedestrian is detected, the situation may be displayed as text on the electronic boards. The electronic boards may include light-emitting diode (LED) light sources.

Figure 4:
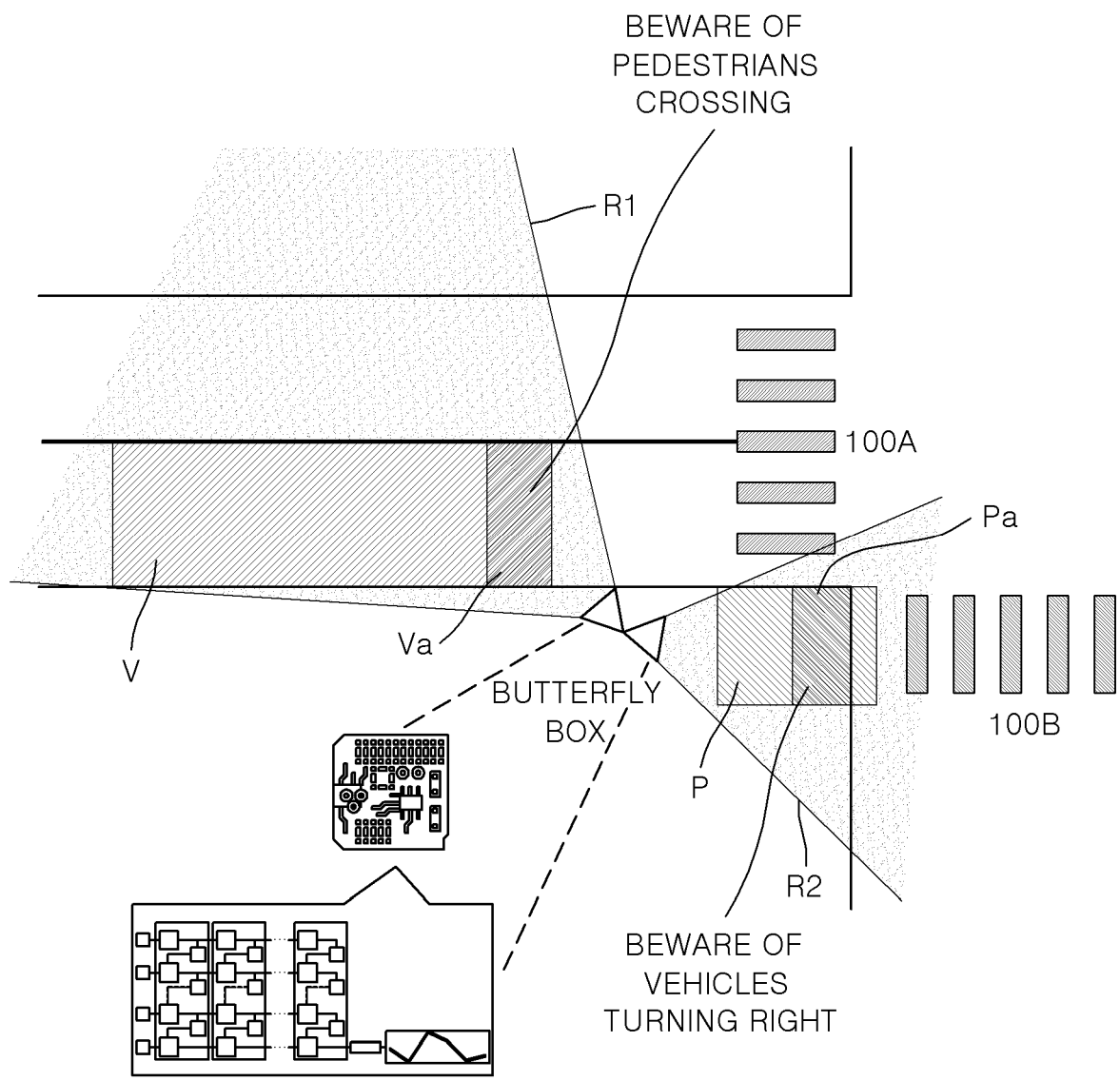
FIG. 4 is a diagram showing the text "Beware of pedestrians crossing" and "Beware of vehicles turning right" displayed on the ground in FIG. 1.

At night, accidents frequently occur due to poor visibility of drivers and pedestrians, and thus a projector beam-type ground warning service is used. When a beam-type ground warning is output, the pedestrian warning projection area Va for an alarm about a pedestrian is set at a location which is spaced 10 m from the crosswalk such that drivers are prevented from driving through a road on which a pedestrian is present. An alarm about a vehicle is displayed at a part of the sidewalk leading to the crosswalk to prevent pedestrians from entering the crosswalk. As beam-type ground warnings, the text "Beware of pedestrians crossing" and "Beware of vehicles turning right" may be displayed on the ground for at least three to five seconds as shown in FIG. 4.

Figure 5:
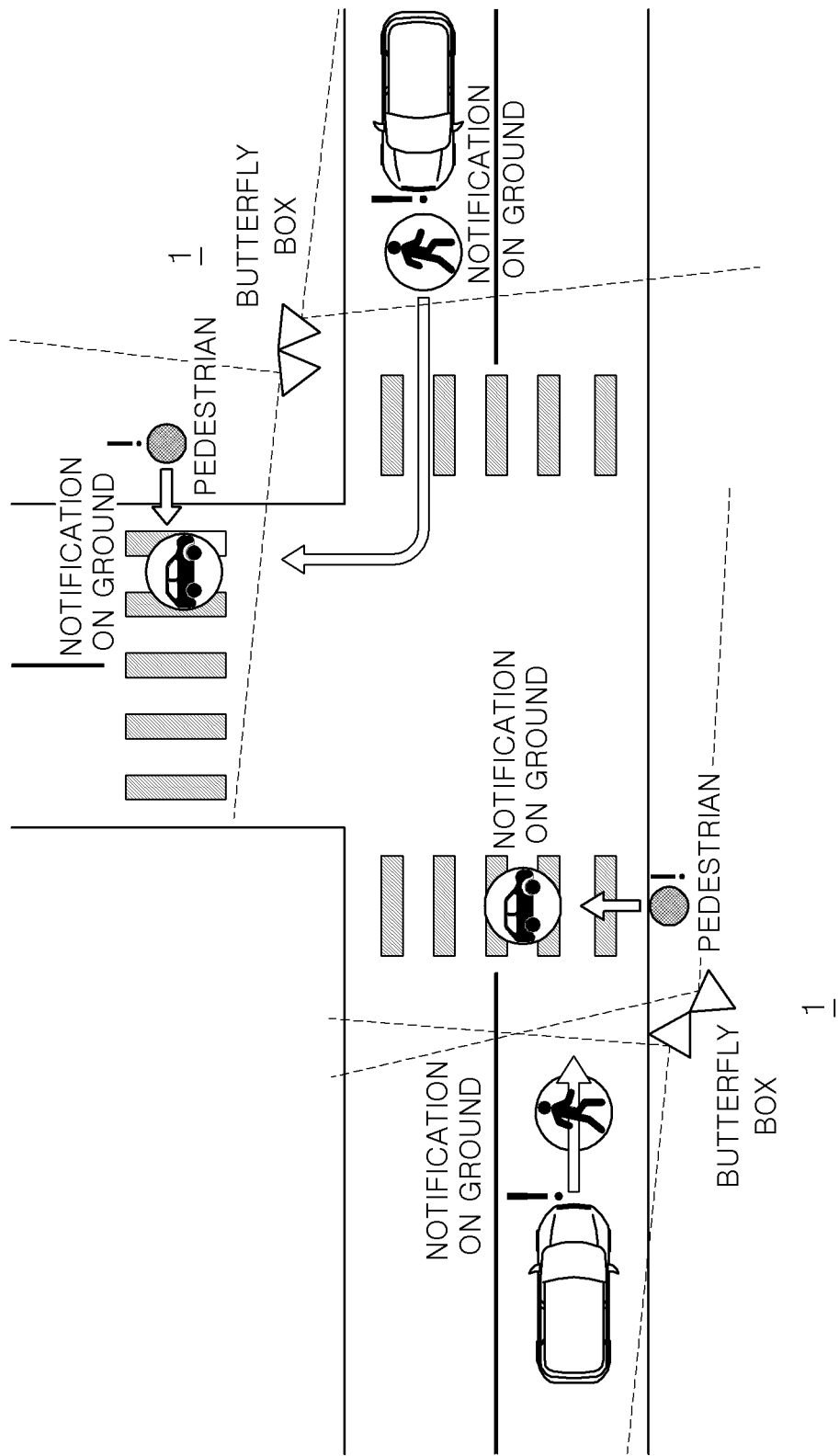
FIG. 5 is a diagram illustrating output of warnings according to another exemplary embodiment of the present invention.

FIG. 5 is a diagram illustrating two butterfly boxes 1 installed at crosswalks to output warnings according to another exemplary embodiment of the present invention. Beam projectors are used to display pedestrian and vehicle images in red color rather than text, and thus visibility is increased.

The system of the present invention can efficiently provide a pedestrian safety service by analyzing not only a vehicle speed and the location of a pedestrian but also detailed action information such as a pedestrian's gaze.

Also, it is possible to predict a potential level of danger by collecting and analyzing long-term behavioral information of a corresponding area and provide the corresponding information to drivers and pedestrians in advance rather than to instantaneously recognize a dangerous situation and provide a service. Accordingly, traffic accidents can be fundamentally prevented, and a pedestrian environment for pedestrians can be improved.

Although the exemplary embodiments of the present invention have been described above, the present invention is not limited thereto, and various modifications and alterations can be made to the present invention. It is self-evident that the following claims and equivalents thereof fall within the scope of the present invention.

What is claimed is:

1. A system for warning about an intersection danger on a basis of behavior prediction, the system comprising:
    a first box configured to detect a vehicle and output a warning to a driver of the vehicle; and
    a second box configured to detect a pedestrian and output a warning to the pedestrian,
    wherein the system is disposed on a sidewalk to simultaneously acquire an image of the vehicle and an image of the pedestrian;
    a pedestrian image receiver;
    a pedestrian action predictor configured to predict an action of the pedestrian after a certain time has elapsed on a basis of image data received in the pedestrian image receiver;
    a vehicle image receiver;
    a vehicle movement predictor configured to predict movement of the vehicle after the certain time has elapsed on a basis of image data received in the vehicle image receiver;
    a danger prediction determiner configured to determine whether a dangerous situation will occur on a basis of data of the pedestrian action predictor and data of the vehicle movement predictor; and
    a warning displayer,
    wherein the first box and the second box have the same appearance and are installed symmetrically with respect to a post,
    a first image sensor configured to acquire the image of the vehicle is installed on an external surface of the first box,
    a second image sensor configured to acquire the image of the pedestrian is installed on an external surface of the second box,
    the second image sensor images eyes in the pedestrian's face and the pedestrian's gaze and transmits an eye image and a gaze image to the pedestrian action predictor,
    the pedestrian action predictor calculates a posture after the certain time has elapsed on a basis of the pedestrian's gaze, and
    the system including the first box and the second box is installed at an intersection in which the vehicle makes a right turn and a crosswalk is disposed immediately after where the vehicle makes the right turn.

2. The system of claim 1, wherein the danger prediction determiner determines that the dangerous situation will occur on the basis of the data of the pedestrian action predictor and the data of the vehicle movement predictor when locations of the pedestrian and the vehicle overlap or are within a certain distance after the certain time has elapsed.

3. The system of claim 1, wherein a beam projector configured to notify the vehicle driver of the dangerous situation is installed on the external surface of the first box and displays text or an image providing a notification of the dangerous situation at a certain distance in front of the crosswalk, and
    another beam projector configured to notify the pedestrian of the dangerous situation is installed on the external surface of the second box and displays text or an image providing a notification of the dangerous situation at the sidewalk in front of the crosswalk.

4. The system of claim 1, wherein an electronic board configured to notify the vehicle driver of the dangerous situation is installed on the external surface of the first box, and
    another electronic board configured to notify the pedestrian of the dangerous situation is installed on the external surface of the second box.

* * * * *